(12) United States Patent
Shih et al.

(10) Patent No.: US 9,180,400 B2
(45) Date of Patent: Nov. 10, 2015

(54) ELECTRIFIED DESORPTION DEVICE FOR DEHUMIDIFICATION

(71) Applicant: INDUSTRIAL TECHNOLOGY RESEARCH INSTITUTE, Hsin-chu (TW)

(72) Inventors: Ming-Shiann Shih, Pingjhen (TW); Jau-Chyn Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 373 days.

(21) Appl. No.: 13/668,018

(22) Filed: Nov. 2, 2012

(65) Prior Publication Data

US 2013/0112079 A1  May 9, 2013

(30) Foreign Application Priority Data

Nov. 4, 2011  (TW) .............................. 100140378 A

(51) Int. Cl.
*B01D 53/26* (2006.01)
*B03C 3/40* (2006.01)
(Continued)

(52) U.S. Cl.
CPC .............. *B01D 53/06* (2013.01); *B01D 53/261* (2013.01); *B01J 20/02* (2013.01); *B01J 20/10* (2013.01); *B01J 20/3433* (2013.01); *B01J 20/3441* (2013.01); *B01D 2253/106* (2013.01); *B01D 2259/4009* (2013.01);
(Continued)

(58) Field of Classification Search
CPC combination set(s) only.
See application file for complete search history.

(56) References Cited

U.S. PATENT DOCUMENTS 4,544,378 A   10/1985   Coe et al.
4,853,202 A    8/1989   Kuznicki
(Continued)

FOREIGN PATENT DOCUMENTS

CN   101745288 A   6/2010
CN   101785952 A   7/2010
(Continued)

OTHER PUBLICATIONS

Korea Patent Office, Notice of Allowance issued on Aug. 29, 2014.
(Continued)

*Primary Examiner* — Duane Smith
*Assistant Examiner* — Sonji Turner
(74) *Attorney, Agent, or Firm* — Rabin & Berdo, P.C.

(57) ABSTRACT

An electrified desorption device, including a conductive water-absorbing material containing titanosilicates, wherein a ratio of silicon atoms to titanium atoms in the titanosilicates of the conductive water-absorbing material is $$1 \le \frac{Si}{Ti} \le 10;$$

a conductive layer selected from the group consisting of a metal component, an alloy material, a conductive oxide component, and a mixture including either (a) more than one of the foregoing components or (b) the metal component, the alloy material, and graphite, attached to end surfaces at two sides of the water-absorbing material; a pair of electrode structures, coupled to two sides of the water-absorbing material respectively, and each having multiple sub-electrodes insulated from each other; and a voltage source, coupled to the pair of electrode structures.

15 Claims, 19 Drawing Sheets
(7 of 19 Drawing Sheet(s) Filed in Color)

(51) Int. Cl.
  *B03C 3/04* (2006.01)
  *B01D 53/06* (2006.01)
  *B01J 20/10* (2006.01)
  *B01J 20/02* (2006.01)
  *B01J 20/34* (2006.01)

(52) U.S. Cl.
  CPC ............... *B01D 2259/40096* (2013.01); *B01D 2259/4508* (2013.01); *B01J 2220/42* (2013.01)

(56) References Cited

U.S. PATENT DOCUMENTS

| | | | |
|---|---|---|---|
| 4,861,571 A | | 8/1989 | Harada et al. |
| 4,938,939 A | | 7/1990 | Kuznicki |
| 5,070,052 A | | 12/1991 | Brownscombe et al. |
| 5,417,950 A | | 5/1995 | Sheu et al. |
| 5,470,557 A | | 11/1995 | Garney |
| 5,505,769 A | | 4/1996 | Dinnage et al. |
| 5,565,077 A | * | 10/1996 | Gold et al. ............ 204/666 |
| 5,670,125 A | | 9/1997 | Sheu et al. |
| 5,910,292 A | | 6/1999 | Alvarez, Jr. et al. |
| 5,958,356 A | | 9/1999 | Dong et al. |
| 8,043,414 B2 | * | 10/2011 | Jeng et al. ............ 95/113 |
| 8,123,840 B2 | * | 2/2012 | Marra ............ 96/16 |
| 8,187,368 B2 | * | 5/2012 | Shih et al. ............ 96/143 |
| 2004/0097371 A1 | * | 5/2004 | Jangbarwala ............ 502/439 |
| 2010/0175557 A1 | * | 7/2010 | Shih et al. ............ 96/146 |
| 2010/0269694 A1 | * | 10/2010 | Sawada et al. ............ 95/96 |
| 2012/0048109 A1 | * | 3/2012 | Chinn et al. ............ 95/130 |

FOREIGN PATENT DOCUMENTS

| | | |
|---|---|---|
| CN | 101879438 A | 11/2010 |
| JP | 1990277455 | 11/1990 |
| JP | 1990307527 | 12/1990 |
| JP | 1994210164 | 8/1994 |
| JP | 1995060116 | 3/1995 |
| JP | 1997019619 | 1/1997 |
| JP | H10128035 A | 5/1998 |
| JP | 2002526237 | 8/2002 |
| JP | 2004230369 A | 8/2004 |
| JP | 2009220094 | 10/2009 |
| JP | 2010158661 | 7/2010 |
| KR | 102005007212 | 10/2010 |
| TW | 367307 | 8/1999 |
| TW | 564770 U | 12/2003 |
| TW | I230244 B | 4/2005 |
| TW | 200604477 | 2/2006 |
| TW | I255330 B | 5/2006 |
| TW | M321979 U | 11/2007 |
| TW | 200907258 A | 2/2009 |
| TW | 200940919 A | 10/2009 |
| TW | 201026374 A | 7/2010 |
| TW | 201037239 A | 10/2010 |
| TW | 201136835 A | 11/2011 |
| WO | WO-9300152 A1 | 1/1993 |

OTHER PUBLICATIONS

Japan Patent Office, Office Action, Patent Application Serial No. 2012094034, Oct. 1, 2013, Japan.
Taiwan Patent Office, Office Action, Patent Application Serial No. TW101109083, Apr. 22, 2014, Taiwan.
China Patent Office, Office Action issued on Jul. 29, 2014.
European Patent Office, Office Action, Patent Application Serial No. 12193931.8-1356 dated May 17, 2013.
China Patent Office, Office Action, Patent Application Serial No. 201110428416.X, Mar. 26, 2014, China.
Liu et al., "Synthesis and Characterization of Titanium Silicilate Zeolite ETS-10 Using Anatase ", Journal of Northeastern University (Natural Science), vol. 32, No. 9, Sep. 2011, pp. 1278-1281.
Song et al., "Effects of adsorption and temperature on a nonthermal plasma process for removing VOCs", Journal of Electrostatics, vol. 55, pp. 189-201, Jun. 2002.
Okubo et al., "Nox concertration using adsorption and nonthermal plasma desorption", IEEE Transactions on Industry Applications, vol. 38, No. 5, Sep./Oct. 2002.
Yamamoto et al., "Plasma desorption and decomposition", Industry Applications Conference, 1998 IEEE, Thirty-Third IAS Annual Meeting, vol. 3, pp. 1877-1883, Oct. 1998.
Uroki et al., "Regeneration of Honeycomb Zeolite by Nonthermal Plasma Desorption of Toluene ", IEEE Transactions on Industry Applications, vol. 45, No. 1, Jan./Feb. 2009.

* cited by examiner

ELECTRIFIED DESORPTION DEVICE FOR DEHUMIDIFICATION

BACKGROUND OF THE INVENTION

1. Field of Invention

The present invention relates to a dehumidification device and an electrified desorption device thereof, and more particularly to a low-energy consumption dehumidification device and an electrified desorption device thereof in which electrification is performed so that a water-absorbing material generates heat due to electrical conduction so as to desorb moisture.

2. Related Art

In dehumidification of an existing household dehumidifier, a refrigerant compressor system is used to condense the moisture in the air, so as to achieve the purpose of drying indoor air. However, due to a damage to the ozone layer derived from the use of a chlorofluorocarbon (CFC) refrigerant, more and more attention is paid to the development of a dehumidifying technology without requiring any refrigerant. A rotary adsorption dehumidification device needs neither the compressor nor the refrigerant, which adsorbs the moisture in the indoor air through a dehumidifying wheel, and then heats the air through electric heat and enables the heated air to flow through a regeneration side of the dehumidifying wheel for moisture desorption. The high-temperature high-humidity air at an outlet of the regeneration side is introduced into a heat exchanger for condensation, and a water-collecting box is used to collect the condensed moisture, so as to achieve the purpose of the household dehumidification device.

Since the dehumidifying-wheel-type dehumidifier implements the dehumidifying mechanism through a moisture-absorbing characteristic of the dehumidifying wheel, the dehumidifier of this type is not limited by the environmental gas temperature and humidity conditions, and does not need to use the existing compressor, so the dehumidifier has technical advantages of low noise and avoiding the use of refrigerant.

Referring to FIG. 1, a rotary adsorption dehumidifier 1 blows an indoor humid airflow 90 into a pore channel inside a water-absorbing material 11, so that the water-absorbing material adsorbs moisture in the airflow 90. A dry airflow 92 after the adsorption is discharged into the room through a dehumidifying fan 12, and then the air dehumidification is completed. On the other hand, an electric heater 13 increases the temperature of a circulation airflow 91, and through a temperature difference between the high-temperature circulation airflow 91 and water molecules in the water-absorbing material 11, the water molecules in the water-absorbing material 11 are vaporized and desorbed. Afterwards, the high-temperature high-humidity circulation airflow 91 enters a heat exchanger 10, and then exchanges heat with the low-temperature humid airflow 90 at an inlet of the dehumidifier 1. The high-temperature high-humidity air in the heat exchanger can be condensed into liquid water 93, and the condensed moisture is collected and discharged. The circulation airflow 91 returns to the regenerative electric heater 13 by following the pipeline to perform the above operations, so as to complete the circulation operation of the moisture desorption. The functions of the water-absorbing material 11, the electric heater 13, and the heat exchanger 10 are combined through an air passage, and then a dehumidifier 1 with a dehumidifying effect can be formed.

The water-absorbing material in the dehumidifying wheel is basically of a porous structure, and the pore structure is generally of a honeycomb type or a corrugate type. The dehumidifying effect is basically to generate dry air by using countless pores and adsorbents in the structure to catch the water molecules in the gas by physical adsorption. The moisture adsorbing amount of the dehumidifying wheel depends on multiple factors, including the type and amount of the adsorbent, the temperature and humidity of the inflow air, the thickness of the dehumidifying wheel, a surface area of the honeycomb structure, the speed of the air flowing through the dehumidifying wheel, and a rotation speed of the dehumidifying wheel. In another regenerative circulation air passage, the moisture adsorbed in the dehumidifying structure needs to be desorbed and discharged, and the adsorption and the desorption are repeated, so as to implement the functions of dehumidification and regeneration. The regenerative circulation air passage refers to a passage, passing through the heat exchanger 10, from a junction surface of an outlet of the electric heater 13 and the water-absorbing material 11 (the dehumidifying wheel) to an inlet of the electric heater 13. Therefore, for the water-absorbing material 11 (the dehumidifying wheel), the air inlet is at a regeneration side through which the heated air enters the dehumidifying wheel, and the air outlet is at a wheel surface of the regeneration side before the high-temperature high-humidity air enters the heat exchanger. In the rotary adsorption dehumidifying system, the high-temperature high-humidity air at the regeneration side enters a condensation device and then exchanges heat with the low-temperature air out of the pipe, and afterwards, the high-temperature high-humidity air in the condensation device can be condensed to generate liquid water.

In the existing rotary adsorption dehumidification device, the electric heater is used to heat the airflow at the regeneration side to increase the temperature of the regeneration air, and the heating desorption mechanism of this part mainly includes the following two parts.

(1) Airflow vaporization through heat exchange: the airflow at the regeneration side is heated to generate a temperature gradient, the heat generated through the heat exchange is used to vaporize the moisture in the pores of the dehumidifying structure, and it is necessary to make high-temperature air during the moisture desorption process and the vaporization needs to be performed for a long time, so as to achieve the moisture desorption effect, so it is necessary to consume high energy to achieve the drying and dehumidifying objectives.

(2) Vaporization through radiant heat: a heating wire in the heater generates high temperature after a current flows therethrough, and the heat is in the form of radiant heat, so that the water molecules in the pores of the dehumidifying structure can directly absorb the radiant heat for vaporization and desorption; since the radiant heat is in a biquadrate direct proportion to the surface temperature, the temperature of the heating wire surface is over 400° C., and the radiant heat is very high, so the generated moisture desorption effect is more remarkable than the vaporization desorption effect of the airflow through heat exchange.

Through the analysis for the above two vaporization mechanisms, in the existing regenerative desorption method by heating, during either the indirect vaporization desorption caused by heating the regeneration airflow or the absorption of the radiant heat by the water molecules, most of the radiant heat is also absorbed by the moisture-absorbing structure, and the two factors result in inevitable energy consumption. In addition, the radiant heat increases the surface temperature of the moisture-absorbing structure, and does not facilitate the adsorption of the water molecules, thus dramatically reducing the dehumidifying capability. Therefore, the regenerative desorption method by heating is the major cause of high energy consumption of the rotary dehumidification device and reduction of the dehumidifying efficiency.

SUMMARY OF THE INVENTION

In view of the above disadvantages, an objective of the present invention is to provide an electrified desorption device, in which electrodes and conductive layers are disposed at two sides of a conductive water-absorbing material, and the electrodes are electrified so that a current can pass through the conductive layers and power is uniformly supplied to each conductive pore channel of the conductive water-absorbing material to increase temperature, which may affect an attraction between the adsorbed water molecules and the conductive water-absorbing material under set conditions, thereby desorbing the water molecules adsorbed by the conductive water-absorbing material.

The present invention further provides a dehumidification device, which directly applies a voltage on the electrodes to generate a current passing through the water-absorbing material, and can desorb water molecules adsorbed on the conductive water-absorbing material through heat generation, so that the conductive water-absorbing material can adsorb moisture in the air for many times to reduce environmental humidity. The dehumidification device of the present invention can take away the desorbed moisture through a regenerative circulation airflow and enable the water-absorbing material to have a desorption effect through electrification without heating the air in advance, thereby producing a direct effect, decreasing a heat loss and reducing energy consumption during the desorption.

To achieve the above objectives, a technical means of the present invention is to provide an electrified desorption device, which comprises:

a conductive water-absorbing material containing titanosilicates;

a conductive layer containing a metal component, an alloy material, or a mixture of the metal component, the alloy material, and graphite, a conductive layer containing a conductive metallic oxide component or a conductive non-metallic oxide component, or a conductive layer formed by a mixture of the above components, attached to end surfaces at two sides of the water-absorbing material;

a pair of electrode structures, coupled to the conductive layers at the two sides of the water-absorbing material respectively, and each having multiple sub-electrodes insulated from each other; and a direct current (DC) or alternating current (AC) voltage source, coupled to the pair of electrode structures.

The present invention further provides a dehumidification device, which comprises:

a condensation portion;

an electrified desorption device, comprising: a conductive water-absorbing material containing titanosilicates; a conductive layer containing a metal component or a mixture of the metal component and graphite, attached to end surfaces at two sides of the water-absorbing material; a pair of electrode structures, each having multiple sub-electrodes insulated from each other; and a DC or AC voltage source, coupled to the pair of electrode structures; and a regeneration portion, coupled to the condensation portion and the electrified desorption device respectively and further having a conductive water-absorbing material, in which the pair of electrode structures is selectively coupled to conductive layers at two sides of the conductive water-absorbing material.

The beneficial effects of the present invention lie in that, the electrodes are coupled to the conductive water-absorbing material, and the conductive water-absorbing material is directly electrified with a current, so that the conductive water-absorbing material generates heat to achieve a desorption effect, and further maintains a re-adsorbing capability to continue operation without heating the air in advance, thereby producing a direct effect, decreasing a heat loss, and reducing energy consumption during the desorption.

The present invention is described in detail in the following with reference to the accompanying drawings and specific embodiments, but the present invention is not limited thereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will become more fully understood from the detailed description given herein below for illustration only, and thus are not limitative of the present invention, and wherein.

DETAILED DESCRIPTION OF THE INVENTION

The technical solutions of the present invention are described in detail in the following with reference to the accompanying drawings and specific embodiments so as to further understand the objectives, solutions and efficacies of the present invention, but are not intended to limit the protection scope of the appended claims.

Figure 2:
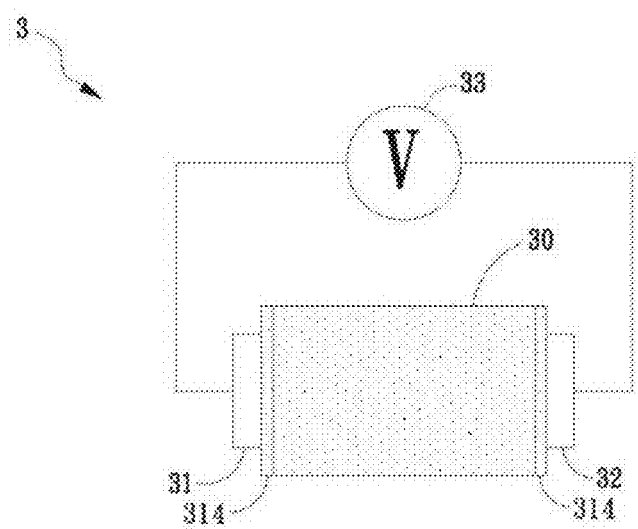
FIG. 2 is a schematic view of an electrified desorption device of the present invention.

Referring to FIG. 2, an electrified desorption device 3 of the present invention has a conductive water-absorbing material 30, two conductive layers 314, a pair of electrode structures 31 and 32, and a voltage source 33.

The conductive water-absorbing material 30 is mainly used to adsorb, but not limited to, moisture contained in the air, and organic volatiles, nitrogen, or carbon dioxide may also be adsorbed at the same time. The conductive water-absorbing material may be a material of a mixture of porous titanosilicates and aluminosilicates in proportion. A ratio of silicon atoms to titanium atoms in the titanosilicates of the conductive water-absorbing material is $$1 \le \frac{Si}{Ti} \le 10,$$

a content of titanosilicate in the conductive water-absorbing material ranges from 1% to 99.99%, or a content of aluminosilicate in the conductive water-absorbing material ranges from 0.01% to 95%, but the present invention is not limited thereto. Other multiple mixtures of titanosilicate and conductive or non-conductive materials with a titanosilicate content of 1%-98.99% also fall within the protection scope of the present invention.

The conductive layers 314 are respectively located on end surfaces at two sides of the conductive water-absorbing material 30, and are disposed so that the end surfaces of the conductive water-absorbing material in a regeneration area have an external voltage value of the same level everywhere, so as to avoid a significant current difference in the regeneration area of the water-absorbing material during electrification (an average current difference among portions is preferably controlled to be ≤±10%). The material of the conductive layer may be antioxidant metal (such as gold or platinum), conductive metallic oxide, conductive non-metallic oxide, graphite, a substance mixed by graphite and metal, or a mixture of the above substances.

The pair of electrode structures 31 and 32 is coupled to the conductive layers 314 on the end surfaces at the two sides of the conductive water-absorbing material 30, so that a current uniformly passes through the conductive water-absorbing material 30.

The voltage source 33 is coupled to the pair of electrode structures 31 and 32, provides a voltage to the pair of electrode structures 31 and 32, and may be a DC or an AC. The voltage source 33 bears a voltage below 500 volts for the water-absorbing material of each centimeter.

Since the electrode structures 31 and 32 are located at the two ends of the conductive water-absorbing material 30, after electrification, through a temporarily applied voltage, a driving force for electrons is formed, or the adsorbed substance is dissociated, or an ion conduction characteristic is formed between the adsorbed substance and specific metal ions or protons, which directly has a conduction and heat-generation effect on the adsorbed substance, so that the adsorbed substance gains energy and then is desorbed from the water-absorbing material. The current conduction mechanism of the present invention may be ion transition in the water-absorbing material, ion or proton conduction resulted from the dissociation of the adsorbed substance, or a comprehensive result of the above effects. In this case, most of energy may be directly applied to the adsorbed water molecules, which causes effective desorption, thereby reducing energy consumption.

In order that the conductive water-absorbing material 30 produces a desorption effect in a specific area (referred to as a regeneration area), and that the conductive water-absorbing material 30 maintains the adsorption effect in other areas (referred to as an adsorption area), insulators are further provided on the electrodes to divide the conductive water-absorbing material 30 into multiple areas.

The existence of the insulator between every two areas can ensure that merely a specific area has a conduction capability when the electrodes are electrified, so that an area of the conductive water-absorbing material 30 where the electrodes are electrified can produce a desorption effect, and other areas where the electrodes are not electrified can continue to adsorb the moisture, few organic volatiles, or trace gas through mass transfer. By turning and displacing the conductive water-absorbing material 30 or turning and displacing electrode elements, the specific area of the conductive water-absorbing material 30 may become a desorption regeneration area.

Figure 3A:
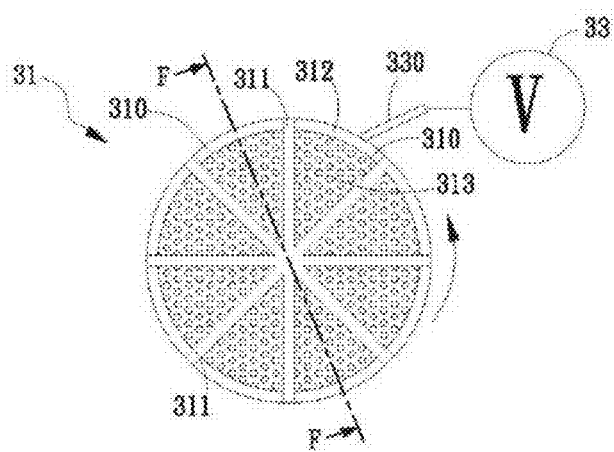
FIG. 3A is a schematic front view of an electrode structure of the present invention.

Referring to FIG. 3A, the electrode structure 31 has multiple sub-electrodes 310. The conductive water-absorbing material may be, but not limited to, a cylinder shape or a disk shape. Each sub-electrode 310 is, but not limited to, of an equally divided sector shape.

Each sub-electrode 310 has an insulation frame 311 and a conductive structure 312.

The insulation frame 311 is disposed at two symmetrical sides of the sub-electrode 310, so that the adjacent sub-electrodes 310 are insulated from each other. The material of the insulation frame 311 may be high-purity aluminum oxide, ceramic, quartz, high polymer material, Teflon, PEEK (polyether ketone fiber), bakelite, or epoxy resin. The above materials may be, but not limited to, used alone or used in combination. The thickness of the insulation frame is, but not limited to, between 1 mm and 5 mm.

The conductive structure 312 is disposed on an outer edge of the sub-electrode 310, and is a metal strip or a metal wire.

To enhance the conduction performance, the conductive structure 312 further has a metal net structure 313 which has regular or irregular pores on a surface thereof, so as to allow air into a tiny passage of the conductive water-absorbing material 30.

Figure 3B:
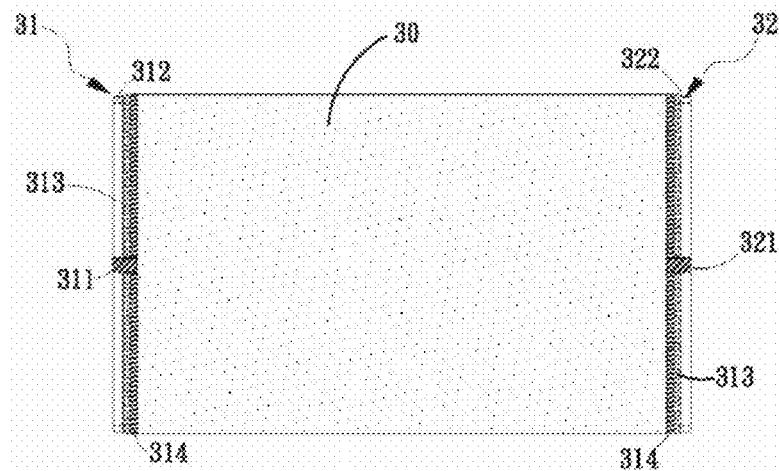
FIG. 3B is a schematic sectional view of the electrode structure and a water-absorbing material along a section line in FIG. 3A.

The material of the metal net structure 313 has no certain limits, and can be any conductive metal material. Referring to FIG. 3B, a conductive layer 314 exists between the metal net structure 313 and the conductive water-absorbing material 30, so as to reduce a contact resistance, and enable the current to uniformly distribute on and pass through a surface of the passage of the conductive water-absorbing material.

The conductive layer 314 is an antioxidant conductive material, which can strengthen a conduction performance and stability of a circuit between each sub-electrode 310 and the conductive water-absorbing material 30, so as to avoid an abnormally discharged electric arc which damages the water-absorbing material.

The material of the conductive layer 314 may be a pure metal material (such as, but not limited to, gold, platinum, silver, copper, and iron), an alloy material (stainless steel), or any metallic oxide or non-metallic oxide that may have conductivity (such as Indium Tin Oxide, ITO ($In_2O_3+SnO_2$)).

Figure 4:
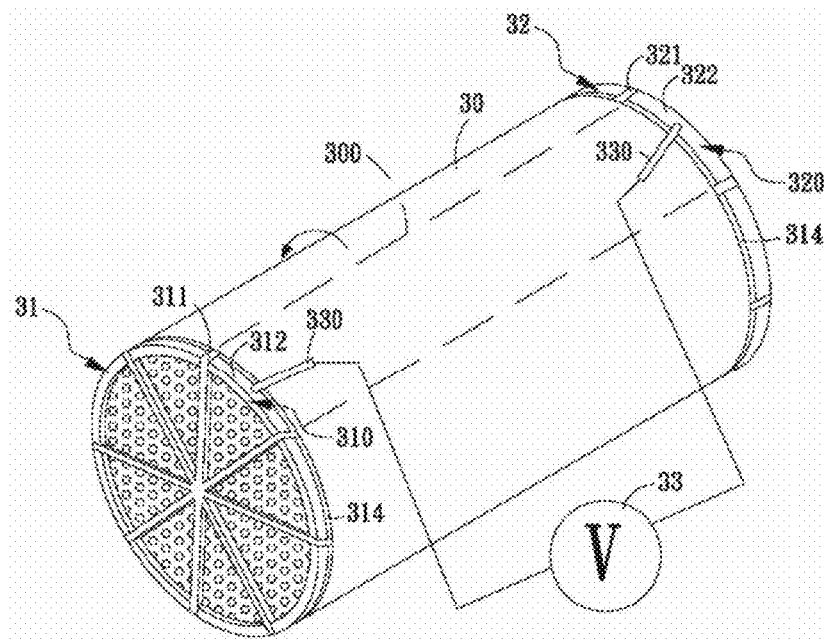
FIG. 4 is a schematic operational view of the electrode structure of the present invention.

Referring to FIG. 4, the conductive water-absorbing material 30 of this embodiment can turn, and in order that each sub-electrode 310 can be separately electrified, the voltage source 33 is further coupled to an electric brush structure 330, which may be electrically connected to different sub-electrodes 310 with turning positions of the conductive water-absorbing material 30 when the conductive water-absorbing material 30 turns.

As shown in FIG. 4, when the conductive water-absorbing material 30 turns, the conductive structure 312 in contact with the electric brush 330 conducts electricity to the whole sub-electrodes 310. Since the electrode structures 31 and 32 correspond to each other, the corresponding water-absorbing material area 300 between the sub-electrodes 310 and 320 in contact with the electric brush 330 is conductive due to a potential difference between the sub-electrodes 310 and 320.

Since the electrode structures 31 and 32 of the present invention are designed with the insulation frames 311 and 321, when the electric brush 330 is in contact with the conductive structures 312 and 322 of the electrode structures 31 and 32, as merely the water-absorbing material area 300 corresponding to the contact position is conductive, it can be ensured that a current passes through the water-absorbing material corresponding to the area 300 for desorption. The water-absorbing material that is not electrified may continue to adsorb, so that the water-absorbing material may have an effect of adsorption and desorption at the same time.

Figure 5A:
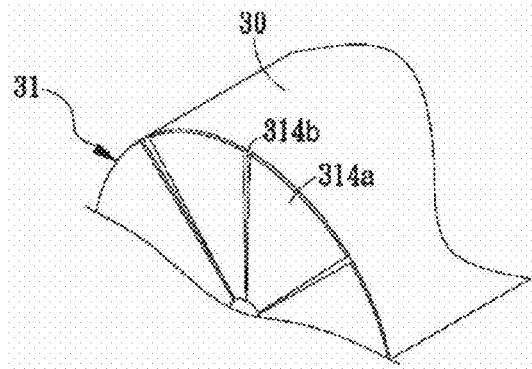
FIG. 5A and FIG. 5B are schematic partial three-dimensional views of another embodiment of an electrode structure of the present invention.
Figure 5B:
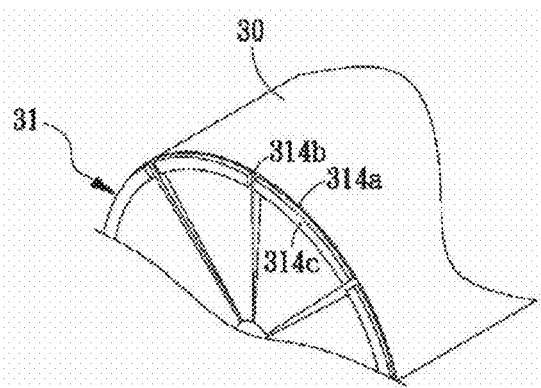

Referring to FIG. 5A and FIG. 5B, the electrode structure 31 may be an antioxidant conductive layer 314a coated on the surface of the conductive water-absorbing material 30, and a groove 314b may be used as an insulation tape, so that the electrode structure 31 has multiple sub-electrodes.

As shown in FIG. 5A, in the insulation area, in addition to the use of the groove, an insulation frame may be further disposed on the groove to enhance the insulation effect.

As shown in FIG. 5B, in order to enhance the electrical contact effect, a conductive structure 314c is disposed on an edge of each sub-electrode formed through the conductive layer 314a, which may be a metal strip, a metal wire, a metal net, or other materials.

Figure 6:
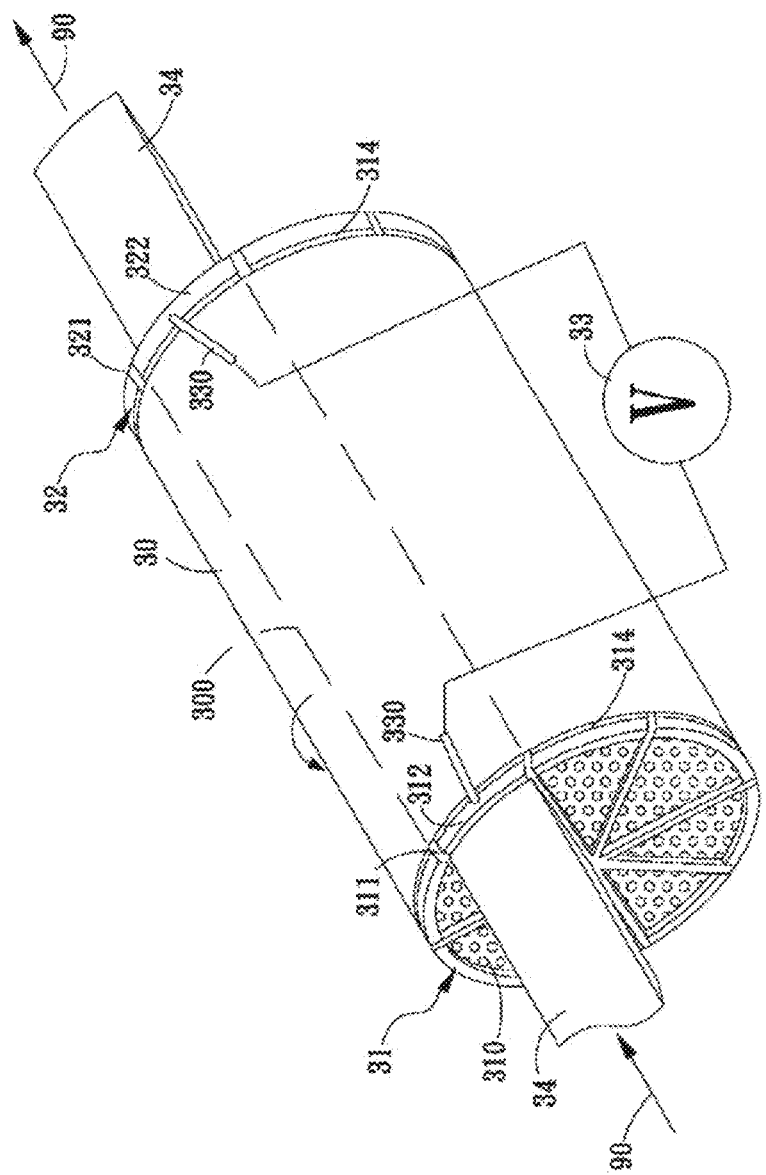
FIG. 6 is schematic three-dimensional view of an electrode structure connected to a regeneration air passage of the present invention.

In FIG. 5A and FIG. 5B, the electrode structure 31 is used for description, but an implementation manner for the electrode structure 32 is the same. Referring to FIG. 6, a regeneration air passage 34 may be further disposed at two sides of the desorption structure area in contact with the corresponding electric brush 330.

The regeneration air passage 34 may introduce a regeneration airflow 90 that independently circulates and flows into the electrified desorption structure area, and the airflow passes through the water-absorbing material in the electrified desorption structure area and takes away the desorbed substance, so as to increase the desorption speed. To improve the efficiency of taking away the substance by the airflow, the airflow 90 may be a heated high-temperature airflow, so as to facilitate desorption and increase the desorption speed.

In the above embodiments, the water-absorbing material can turn. In another embodiment of the present invention, the water-absorbing material does not need to turn to be electrically connected to the electric brush, and each sub-electrode is periodically electrified under the control of a power distribution unit 331.

Figure 7:
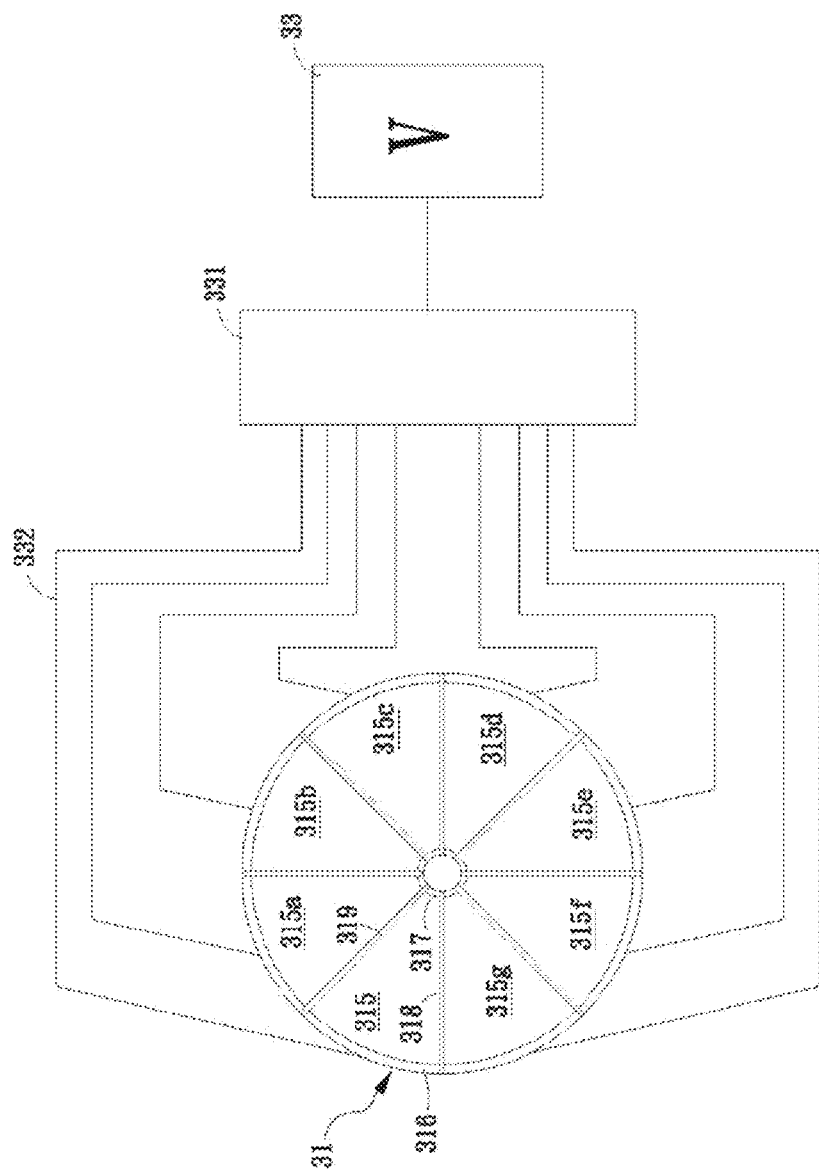
FIG. 7 is a schematic view of further another embodiment of an electrode structure of the present invention.

Referring to FIG. 7, the electrode structure 31 is divided into multiple sub-electrodes 315 and 315a-315g insulated from each other, each of the sub-electrodes has an outer metal frame 316 and an inner metal frame 317, and insulation frames 318 and 319 are disposed at two sides of the metal frames 316 and 317. A conductive cable 332 is extended from each of the sub-electrodes 315 and 315a-315g independently. Each of the sub-electrodes 315 and 315a-315g is electrically connected to the conductive cable at the outer-loop metal frame 316 or the inner-loop metal frame 317.

The conductive cable 332 of each of the sub-electrodes 315 and 315a-315g is regularly and sequentially connected to the power distribution unit 331.

The power distribution unit 331 is electrically connected to the voltage source 33, may receive a positioning control signal, and sequentially supplies power to a specific sub-electrode at proper time. For example, power is first supplied to the sub-electrode 315 on the water-absorbing material, and then is supplied to the sub-electrode 315a, and afterwards to the sub-electrodes 315b-315g sequentially. A result of the sequential power supply is equal to a sequential rotation and regeneration function of the conductive water-absorbing material.

The existence of the insulation frame between every two sub-electrodes can ensure that merely a specific area of the water-absorbing material structure is conductive when the electrode is electrified, so that an area of the conductive water-absorbing material where the sub-electrodes are electrified can have a desorption effect and other areas where the sub-electrodes are not electrified may continue to adsorb.

The power distribution unit 331 is formed by units such as a logical operation unit, a timing element, and a power switch, in which the power switch may be a solid switch formed by a mechanical relay, a switchboard, or a semiconductor element. The power distribution unit of this embodiment is an element in existing well-known technologies, which is not described in detail herein.

Figure 8A:
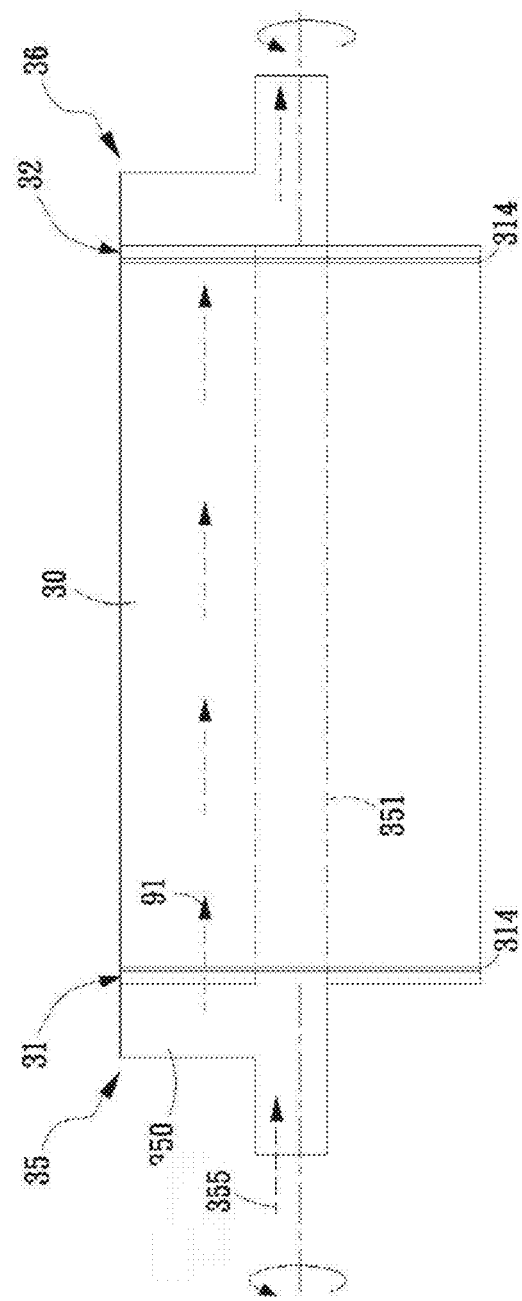
FIG. 8A to FIG. 8C are schematic operational views of an embodiment of a rotating regeneration air passage of the present invention.
Figure 8B:
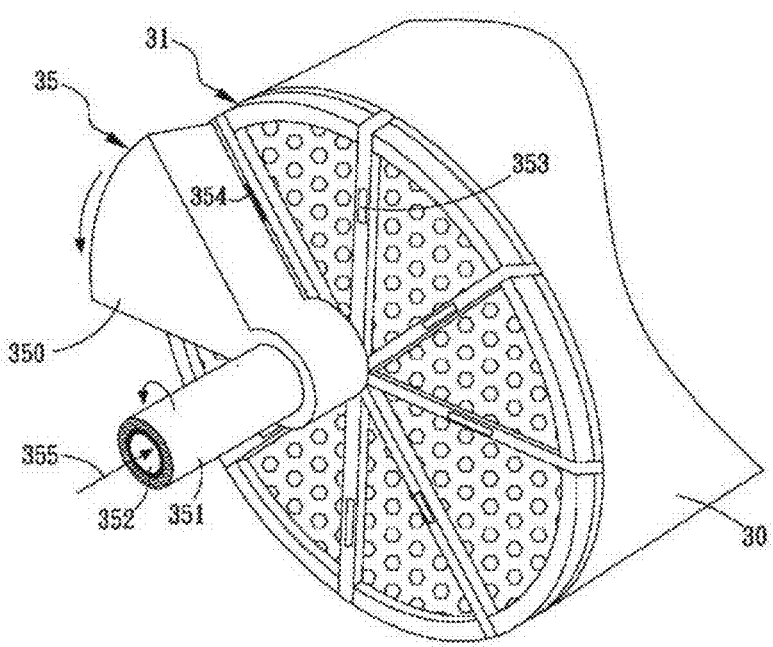

Referring to FIG. 8A and FIG. 8B, the conductive water-absorbing material 30 does not turn, while a regeneration air passage 35 and a collection air passage 36 rotate, and a positioning sensing module senses positions of the regeneration air passage 35 and the collection air passage 36.

The regeneration air passage 35 and the collection air passage 36 correspond to each other and may synchronously turn, in which the regeneration air passage 35 has a casing 350, for an airflow to enter.

The casing 350 is connected to a rotation shaft 351, and the rotation shaft 351 may receive a rotation driving force of a rotation driving unit (such as a motor) and drive the casing 350 of the regeneration air passage 35 to turn. The rotation shaft 351 further has a flow passage 352 for an airflow 355 to enter.

Since the collection air passage 36 synchronously turns with the regeneration air passage 35 through the rotation shaft 351, the airflow 355 passing through the water-absorbing material 30 flows out through the collection air passage 36, which may increase the desorption speed.

The positioning sensing module may be an element having a displacement sensing function such as a mechanical structure, optical detection, magnetic field detection, or sound wave detection, for example, but not limited to, a common micro switch, a photo switch, a reed switch, an ultrasound sensor, or other elements. For example, in this embodiment, the positioning sensing module has a light emitting element 354, disposed on the regeneration air passage, and an optical signal receiving element 353, disposed on each sub-electrode.

Figure 8C:
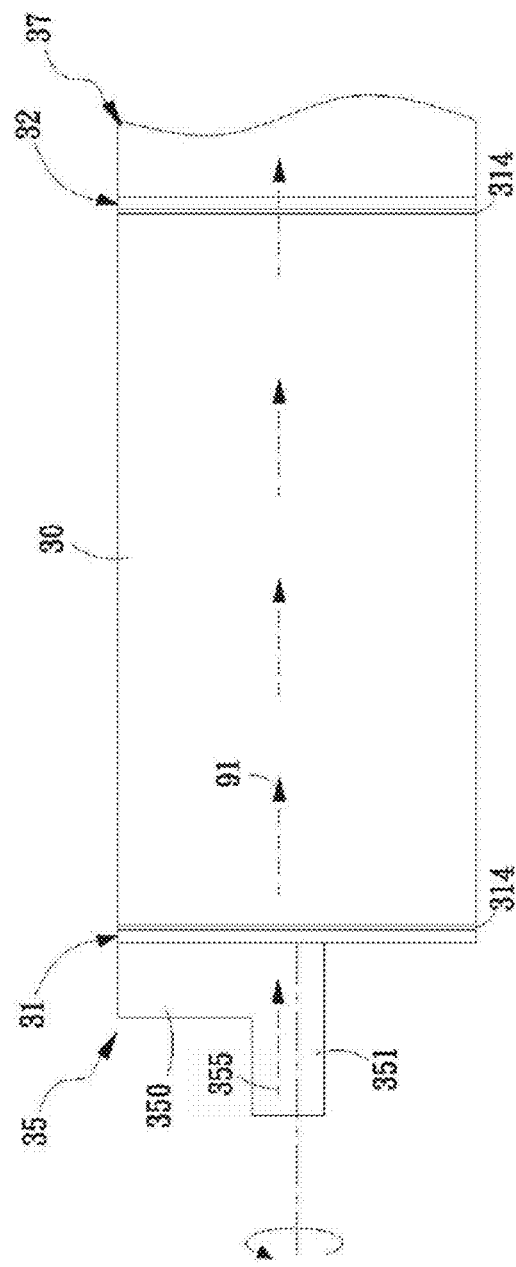

When the regeneration air passage 35 fully covers the sub-electrodes, a positioning control signal is immediately sent to the power distribution unit, and the power distribution unit controls the regeneration air passage to stop rotating, and outputs power to the covered sub-electrodes on the water-absorbing material at proper time to perform a regeneration procedure. In addition to the above synchronous turning design, the collection air passage 37 may also not turn while the regeneration air passage 35 may rotate in the manner shown in FIG. 8C.

The above desorption method may be applicable to a combination of any water-absorbing material having an electrical conduction capability or having the electrical conduction capability after adsorbing moisture and the adsorbed molecules, and may be applied in fixed bed desorption, tower desorption, or wheel desorption.

For example, the method is applied in a household rotary dripping dehumidifier, and FIG. 9 to FIG. 13 illustrate results of testing using the conductive water-absorbing material with electrodes according to the present invention used in the dehumidifier.

The inventors of the present invention have submitted three patent applications disclosing the use of a dehumidifying wheel, with Taiwan Patent Application Nos. 097109268, 098100903, and 098111986 respectively. For example, in Taiwan Patent Application No. 097109268, a voltage of 5000 volts to 20000 volts is used to stimulate a high-frequency (20 kHz-50 kHz) atmospheric plasma with an overall current less than 100 mA to perform desorption and regeneration on a zeolite dehumidifying wheel, and in Taiwan Patent Application No. 098100903, desorption and regeneration is performed with a voltage of 1200 volts to 15000 volts.

However, through experiments for many times, the inventors of the present invention find that, if the dehumidifying wheel has a conduction effect in a moisture-absorbing state, and the desorption effect can be achieved with a low voltage which may be below 500 volts.

Figure 1:
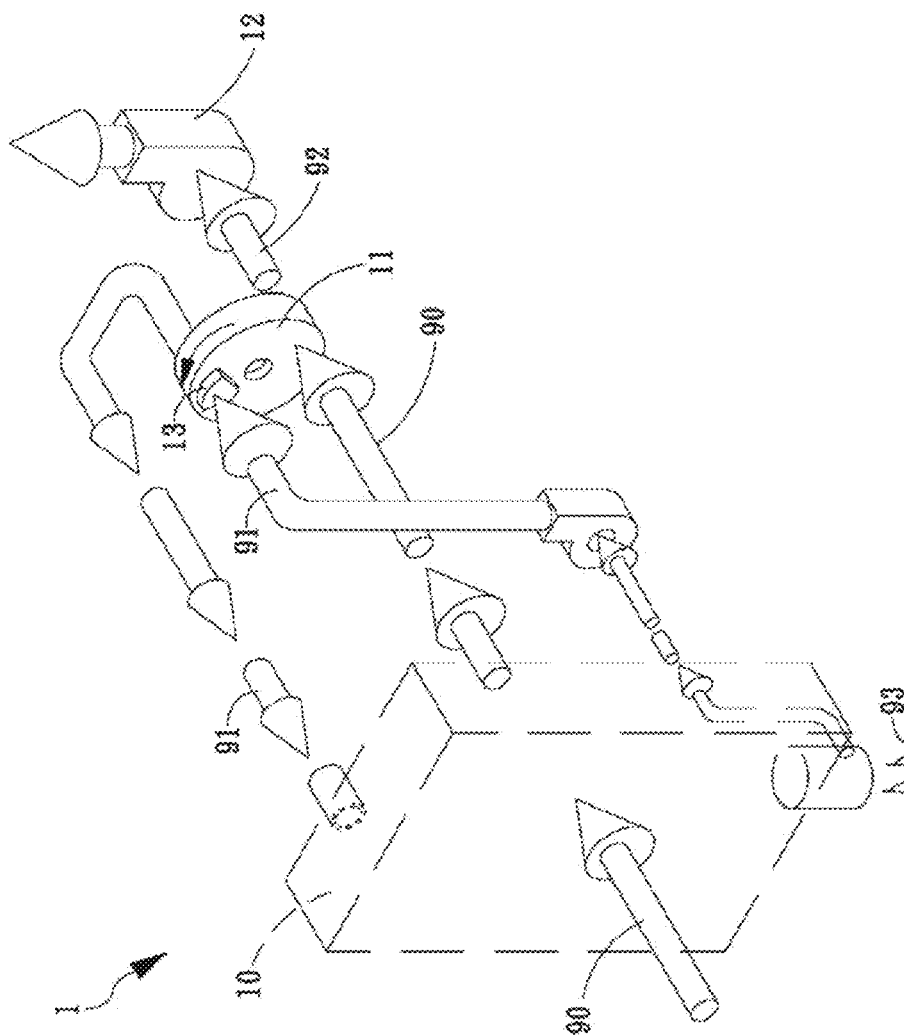
FIG. 1 is a schematic view of an existing dehumidification device using a dehumidifying wheel.

The original zeolite dehumidifier can desorb a water amount of about 6.0 liters/day (20° C., 60% RH) by hot-wind heating, and the required power consumption is about 600 watts (as shown in FIG. 1), which is equivalent to that more than 7800 J energy is required for the desorption of 1 g water.

Therefore, the inventors of the present invention specially set an experiment for proving that the present invention improves the efficacy indeed. In the experiment, it is set that the dehumidifying wheel is in a saturated moisture-absorbing condition, a voltage of 500 volts to 2200 volts may be directly applied to the honeycomb-type zeolite dehumidifying wheel of 2 cm thickness to conduct a current (0.1 mA-2.5 A), which varies with different moisture contents of the dehumidifying wheel. The conduction degree decreases with the reduction of the moisture content of the dehumidifying wheel, and fully dry zeolite is not conductive in the operation at the voltage.

The dehumidifying regeneration system designed with the above method solves the problem that the voltage demand is high and an environmental ozone concentration increases over 5 PPM during the regeneration through the plasma desorption technology.

The following four honeycomb-type zeolite dehumidifying wheels of 2 cm thickness are electrified, and an experimental result obtained when the moisture on the zeolite is desorbed and the zeolite is regenerated after the electrification is illustrated. The testing environment condition is as follows: a speed at a desorption air passage surface is 0.1 m/s, the temperature of the air is 25° C., the relative humidity is 70%, and the moisture-absorbing condition of the dehumidifying wheel is 20° C., 60%.

Figure 9:
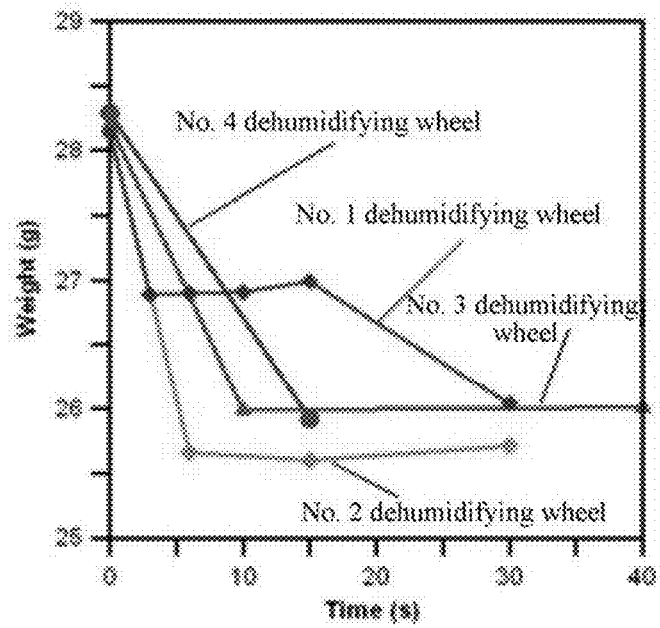
FIG. 9 illustrates a result of weight change of dehumidifying wheels after desorption during an electrification period of time.

As shown in FIG. 9, a result of weight change of the dehumidifying wheels after desorption during an electrification period of time is illustrated. For ease of description, the four dehumidifying wheels are respectively No. 1 dehumidifying wheel, No. 2 dehumidifying wheel, No. 3 dehumidifying wheel, and No. 4 dehumidifying wheel.

Figure 10:
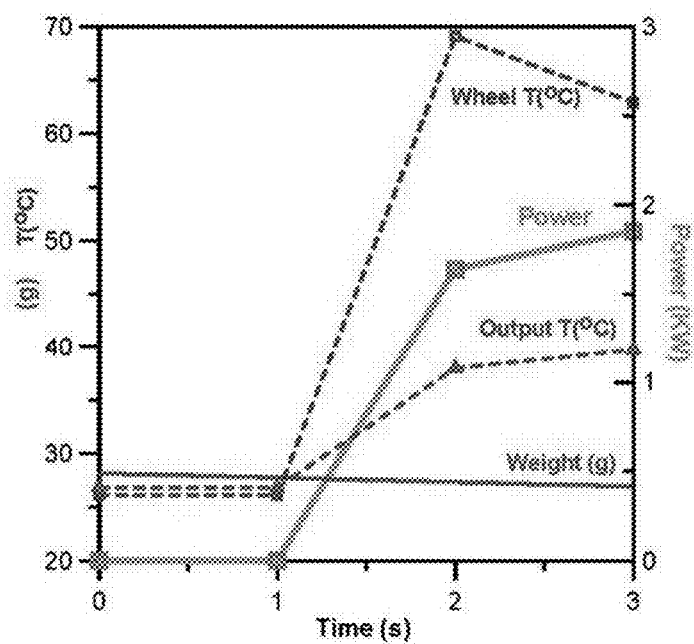
FIG. 10 illustrates a change result of a No. 1 dehumidifying wheel in a specific period of time.

As shown in FIG. 10, a change of the wheel temperature (Wheel T (° C.)), regeneration output temperature (Output T (° C.)), power consumption (Power), and desorption weight (Weight (g)) of the No. 1 dehumidifying wheel in a specific period of time (3 seconds) is illustrated, and average energy consumed for desorption of water per gram is 2817.993 J/g.

Figure 11:
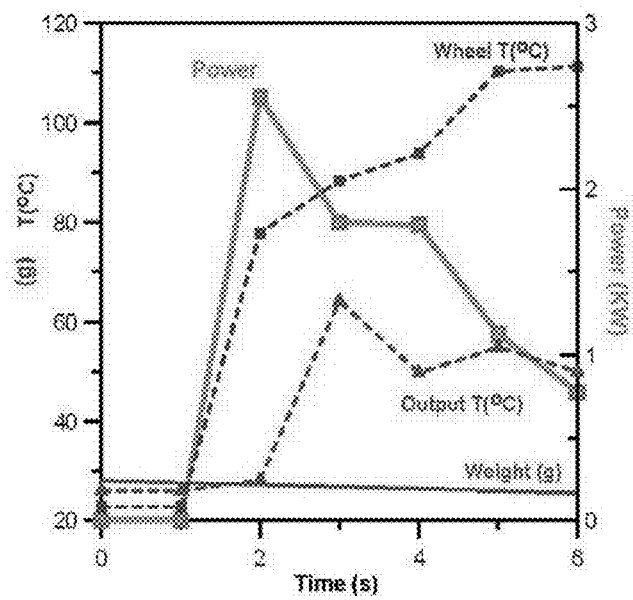
FIG. 11 illustrates a change result of a No. 2 dehumidifying wheel in a specific period of time.

As shown in FIG. 11, a change of the wheel temperature (Wheel T (° C.)), regeneration output temperature (Output T (° C.)), power consumption (Power), and desorption weight (Weight (g)) of the No. 2 dehumidifying wheel in a specific period of time (6 seconds) is illustrated, and average energy consumed for desorption of water per gram is 3216.196 J/g.

Figure 12:
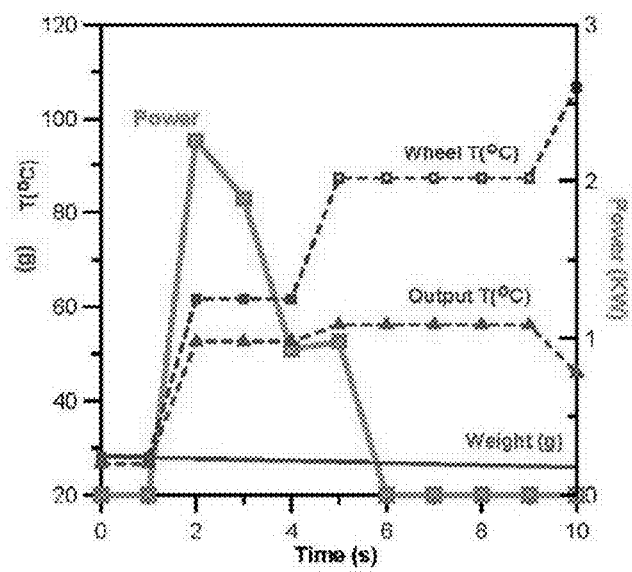
FIG. 12 illustrates a change result of a No. 3 dehumidifying wheel in a specific period of time.

As shown in FIG. 12, a change of the wheel temperature (Wheel T (° C.)), regeneration output temperature (Output T (° C.)), power consumption (Power), and desorption weight (Weight (g)) of the No. 3 dehumidifying wheel in a specific period of time (10 seconds) is illustrated, and average energy consumed for desorption of water per gram is 3119.372 J/g.

Figure 13:
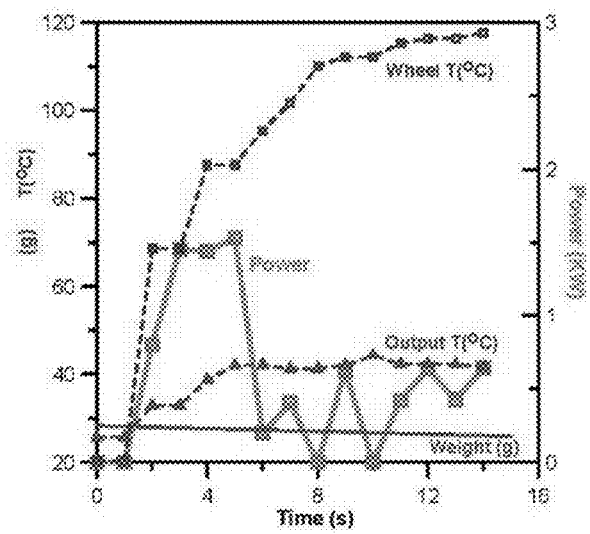
FIG. 13 illustrates a change result of a No. 4 dehumidifying wheel in a specific period of time.

As shown in FIG. 13, a change of the wheel temperature (Wheel T (° C.)), regeneration output temperature (Output T (° C.)), power consumption (Power), and desorption weight (Weight (g)) of the No. 4 dehumidifying wheel in a specific period of time (15 seconds) is illustrated, and average energy consumed for desorption of water per gram is 3620.685 J/g.

To sum up, the inventors of the present invention indicate that, in the zeolite conduction mechanism, different cations ($Li^+$, $Na^+$, $K^+$, $Ca^{2+}$, $Mg^{2+}$) may exist in the zeolite structure, and the cations adsorb polar water molecules through an electric dipole as a physical attraction, resulting in hydration, and then a voltage can be applied to perform ion migration.

Through synthesis technologies, titanosilicate zeolite or titanosilicates with titanium oxide and silicon oxide as main components of a lattice organization may be made, which can effectively increase a cation containing rate in the lattice organization. Better zeolite conduction performance may be achieved through the idea of increasing the cations. The experimental result indicates that the case of $1<Si/Ti<10$ can effectively reduce the electrification voltage so that the conduction voltage of the honeycomb-type zeolite dehumidifying wheel of 2 cm thickness is between 200 volts and 700 volts. The synthesized zeolite dehumidifying wheel may further reduce the voltage of a dehumidifying wheel with the aluminosilicate zeolite as a main component on the basis of the idea of dehumidification and regeneration after electrification, ensure the safety of use in household appliances in the future, and further reduce the energy consumption for the desorption.

Figure 15:
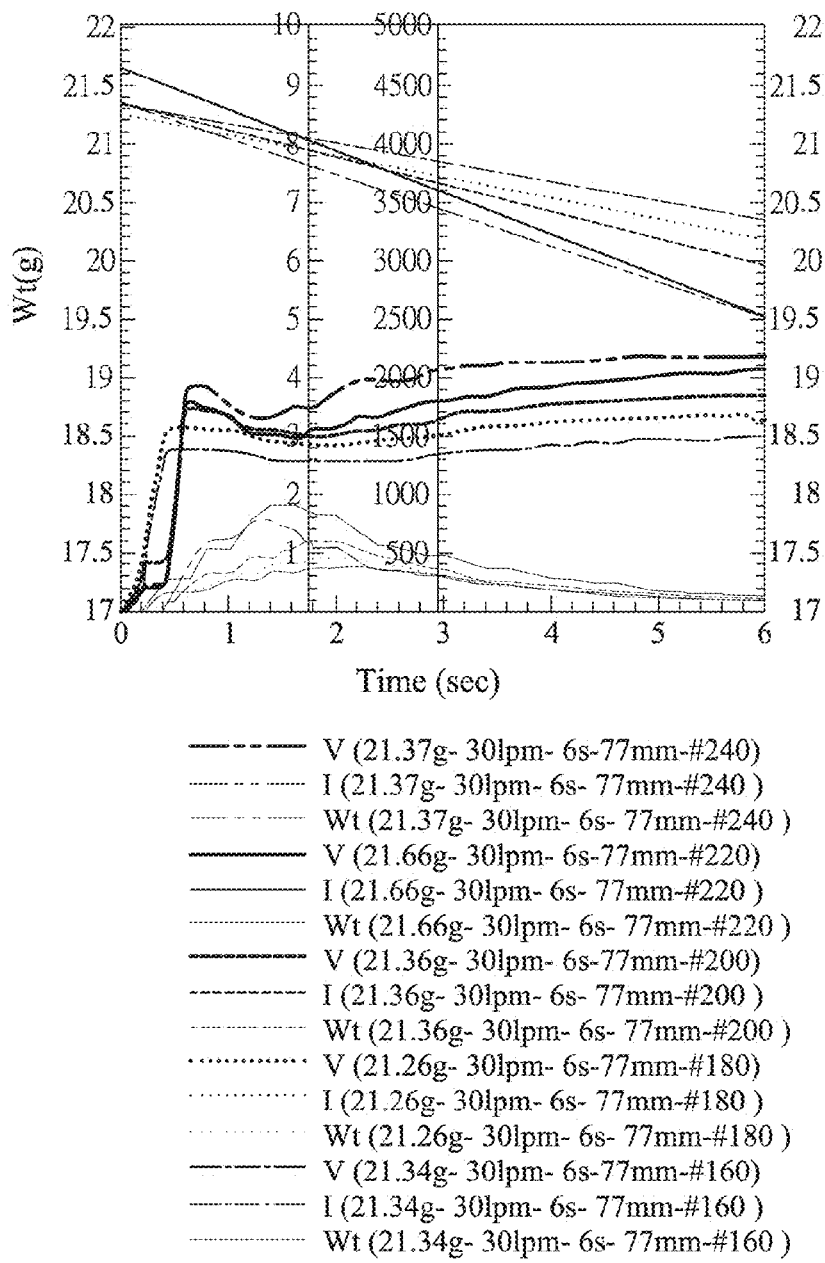
FIG. 15 is an experimental data view of desoprtion zeolite of multiple sets of aluminosilicate zeolite.
Figure 16:
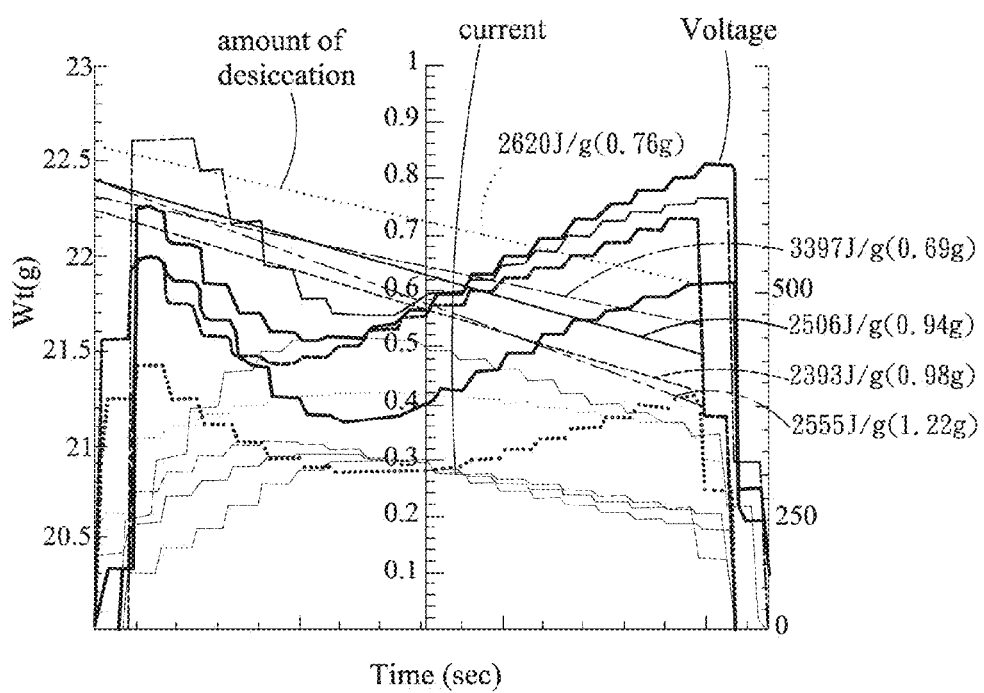
FIG. 16 illustrates experimental data in low-voltage electrification desorption presented by a titanosilicate zeolite dehumidifying wheel.
Figures 17, 18:
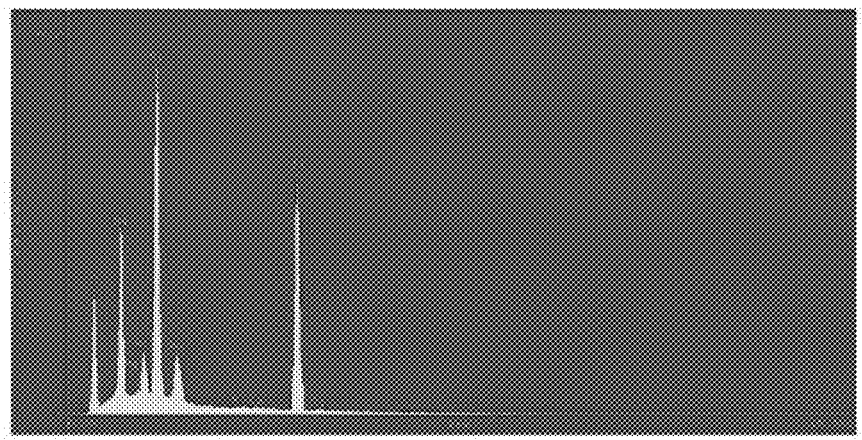
FIG. 17 and FIG. 18 illustrate a titanosilicate component in which a ratio of silicon to titanium is close to 1.8 (22.47/12.31)
Figures 19, 20:
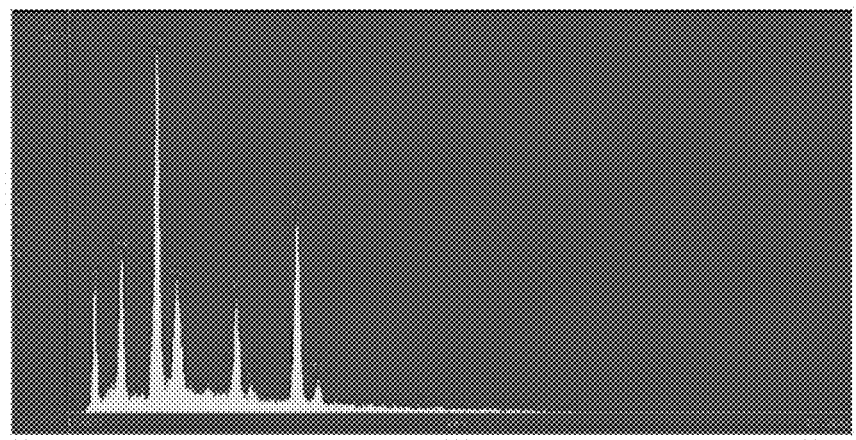
FIG. 19 and FIG. 20 illustrate a titanosilicate component in which a ratio of silicon to titanium is close to 1.132 (13.21/11.66)
Figures 21, 22:
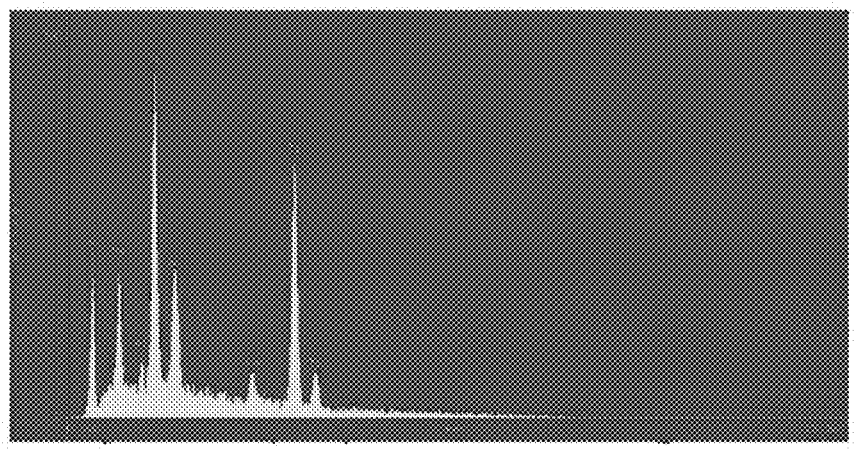
FIG. 21 and FIG. 22 illustrate a titanosilicate component in which a ratio of silicon to titanium is close to 3.7 (22.22/6.01)

Referring to FIG. 15, an experimental data view of desoprtion zeolite of multiple sets of aluminosilicate zeolite is shown; referring to FIG. 16, experimental data in low-voltage electrification desorption presented by a titanosilicate zeolite dehumidifying wheel is illustrated; referring to FIG. 17 and FIG. 18, a titanosilicate component in which a ratio of silicon to titanium is close to 1.8 (22.47/12.31) is illustrated; referring to FIG. 19 and FIG. 20, a titanosilicate component in which a ratio of silicon to titanium is close to 1.132 (13.21/11.66) is illustrated; and referring to FIG. 21 and FIG. 22, a titanosilicate component in which a ratio of silicon to titanium is close to 3.7 (22.22/6.01) is illustrated.

For further describing FIG. 15 to FIG. 22, FIG. 15 illustrates a test when desorption zeolite of multiple sets of aluminosilicate zeolite passes through a tester at a certain air speed (the overall blown air amount is 30l pm and a diameter of an air pipe is 77 mm) in a certain period of time (6 seconds). One set in FIG. 15 is used for description, in which the experimental mark number of the zeolite is 160, the wheel diameter is 77 mm, and at the specific air speed and in the specific period of time, through the corresponding voltage/current, the energy consumption required for desorption of water per gram is illustrated. For example, the original weight of the zeolite with the experimental mark No. 160 is 21.34 g, and after the desorption, the weight thereof is 20.7 g, so the energy consumption required for the desorption of water per gram by the zeolite with the experimental mark No. 160 is 3582 J/g, and the condition for the zeolite with other experimental mark numbers may be deduced in the same way.

FIG. 16 illustrates energy consumption required for the desorption of water per gram by a dehumidifying wheel with multiple sets of titanosilicate zeolite at a corresponding voltage/current. Taking one set thereof for description, the energy consumption required for the desorption of water per gram is 2555 J/g, and the condition for other sets may be deduced in the same way.

FIG. 17 and FIG. 18 describe a titanosilicate component through an example, $(Na, K)_{2X}Ti_XSi_YO_{(3X+2Y)}$. An inspection instrument inspects the proportion and atom number of materials contained in the component, in which the number of atoms contained in titanium (Ti) is 12.31, the number of atoms contained in silicon (Si) is 22.47, so a ratio of Si to Ti is close to 1.8.

As described in FIG. 17 and FIG. 18, FIG. 19, FIG. 20, FIG. 21, and FIG. 22 show the titanosilicate component, in which the proportion and atom number of materials in a later period after the inspection are illustrated. As shown in FIG. 19 and FIG. 20, a ratio of Si to Ti is close to 1.132 (13.21/11.66), and as shown in FIG. 21 and FIG. 22, a ratio of Si atoms to Ti atoms is close to 3.7 (22.22/6.01).

Figure 23:
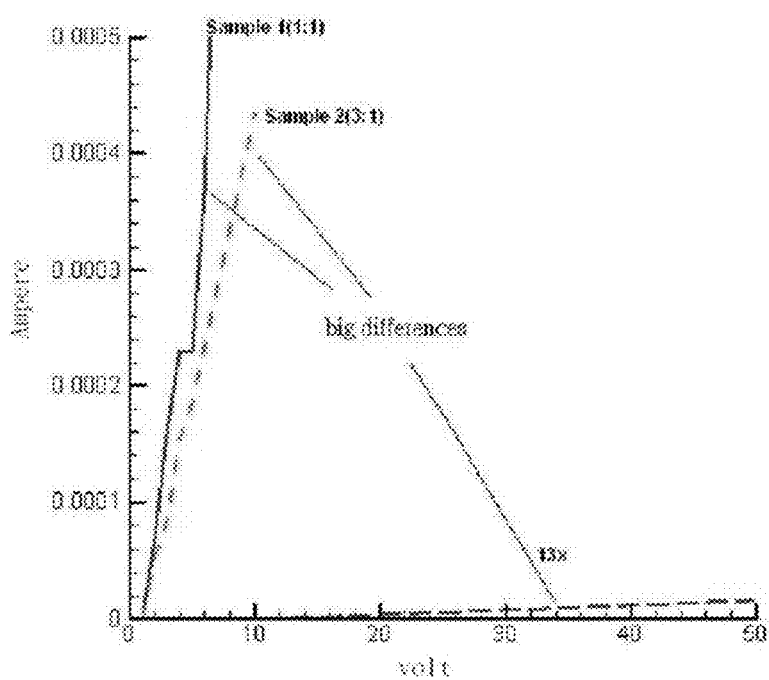
FIG. 23 is a comparison view of conductivity testing curves of the present invention.

Referring to FIG. 23, Sample 1 represents a small granular sample (a ratio of Si atoms to Ti atoms is close to 1) made using the technology of the present invention, Sample 2 represents a small granular sample (a ratio of Si atoms to Ti atoms is close to 3) made using the technology of the present invention, and 13× represents a small granular sample (aluminum silicon material) of an existing dehumidifying wheel. When comparison is performed among 13×, Sample 1, and Sample 2 after a conductivity test, it can be known that, Sample 13× can be electrified only when the operation voltage is 50 volts, while Sample 1 and Sample 2 are electrified when the operation voltage is 2 volts. Therefore, when the material of the desorption device of the present invention operates at a current amplified by 5 times, the operation voltage may be reduced by more than 10 times, that is, to the greatest extent, the operation voltage of 2000 volts may be reduced to a range below 200 volts, while the voltage cannot be dramatically reduced for the material in the existing dehumidifying wheel.

Figure 14:
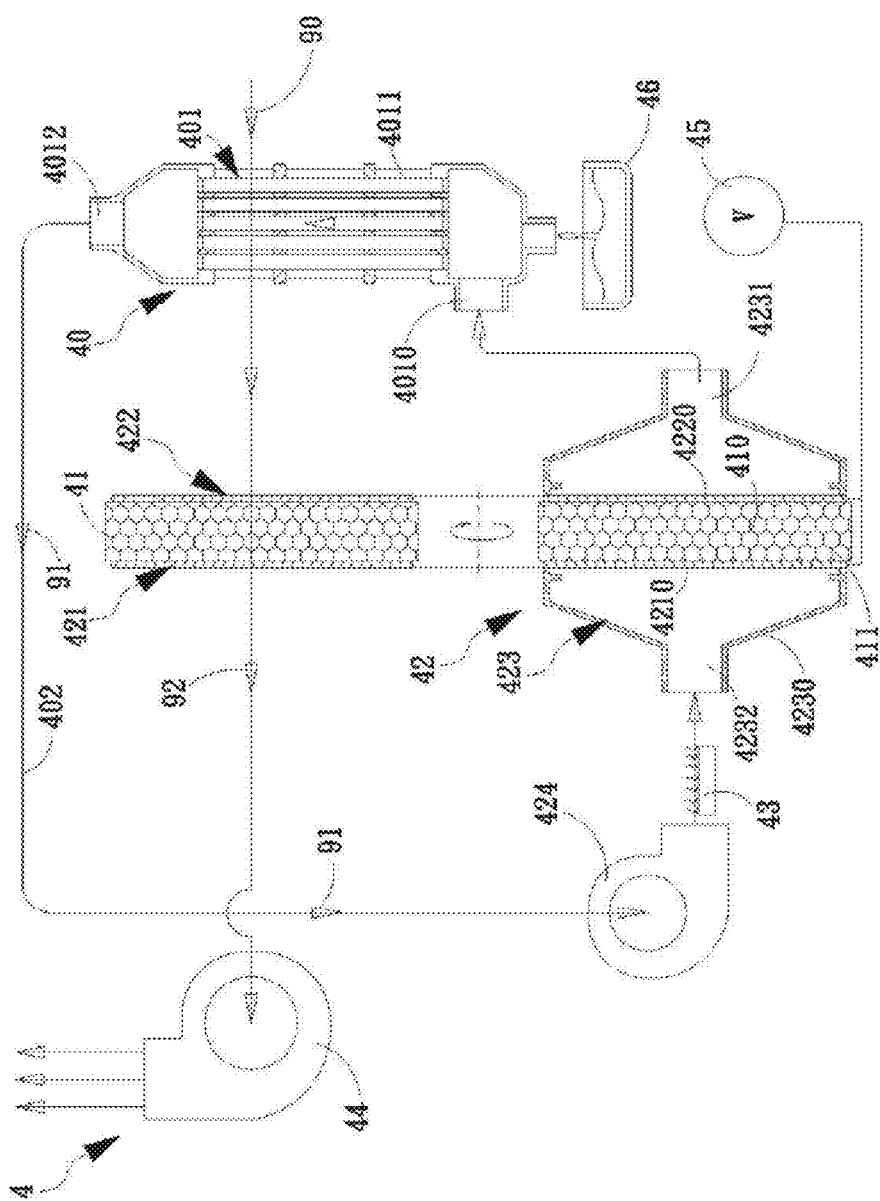
FIG. 14 is a schematic view of a dehumidification device of the present invention.

Referring to FIG. 14 in combination, the present invention further provides a dehumidification device, which includes a condensation portion 40, a direct electrified desorption device, and a regeneration portion 42.

The condensation portion 40 includes a condensation coiler 401 and a circulation pipeline 402, in which the condensation coiler 401 has an inlet end 4010 and an outlet end 4012. In this embodiment, the condensation coiler 401 has multiple condensation pipelines 4011, and a flow passage is disposed therein for a circulation airflow 91 to flow.

Since the condensation coiler 401 is used to enable an airflow 90 to be dehumidified in the external environment to pass through the condensation coiler 401 to exchange heat with the circulation airflow 91 flowing in the condensation coiler 401, so that moisture contained in the circulation airflow in the condensation coiler 401 is condensed into water and then the water flows into a collection disk 46, a gap exists between every two condensation pipelines 4011 for the airflow 90 to pass through. The condensation coiler 401 belongs to the prior art, which is not described in detail herein again.

The electrified desorption device has a conductive water-absorbing material 41, a pair of electrode structures 421 and 422, and a voltage source 45. The electrified desorption device of this embodiment is the same as the above electrified desorption device, which is not described herein again.

The regeneration portion 42 is coupled to the conductive water-absorbing material 41, and has a regeneration air passage 423 and regeneration fan 424.

The connection relation of the pair of electrode structures 421 and 422 is the same as that of the above electrode structures 31 and 32, which is not described in detail herein again.

The regeneration air passage 423 has a casing 4230 to form an airflow passage, one side of the casing 4230 has an outlet end 4231 connected to the inlet end 4010 of the condensation coiler 401, and the other side of the casing 4231 has an inlet end 4232 connected to the regeneration fan 424. The regeneration fan 424 is used to increase a pressure of the circulation airflow 91 and speed up the circulation airflow 91.

The conductive water-absorbing material 41 may enable the airflow 90 to pass through, and has a microstructure 410 therein to absorb the moisture contained in the airflow 90. In this embodiment, the conductive water-absorbing material 41 is a wheel and may rotate. Definitely, the conductive water-absorbing material 41 may also be designed into other structures, which are not limited to the wheel of the present invention.

When the conductive water-absorbing material 41 rotates to a set position, sub-electrodes 4210 and 4220 corresponding to the regeneration air passage 42 and the voltage source 45 are electrified, and substances adsorbed by the water-absorbing material 411 corresponding to the sub-electrodes 4210 and 4220 can be desorbed through the current.

In this embodiment, the circulation airflow 91 may pass through the inside of the casing 4230 of the regeneration portion 42, and in the casing 4230, a portion for receiving the conductive water-absorbing material 41 is provided, so that the circulation airflow 91 flowing in the casing 4230 can take away the substances desorbed after electrification through the conductive water-absorbing material 41.

In order to increase the speed of the airflow 90 to be dehumidified to control the dehumidification effect, in this embodiment, a dehumidifying fan 44 may be further disposed to discharge a dry airflow 92 passing through the water-absorbing material 41 out of the device 4. In addition, the dehumidification device 4 may be further provided with a heating unit 43 that is selectively added according to the demands. In this embodiment, the heating unit 43 is disposed between the inlet end 4232 of the regeneration portion 42 and the regeneration fan 424. The heating unit 43 may provide heat to the circulation airflow 91 to increase the temperature of the circulation airflow 91, so as to enhance a condensation effect for the desorbed moisture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrified desorption device, comprising:
   a conductive water-absorbing material containing titanosilicates, wherein a ratio of silicon atoms to titanium atoms in the titanosilicates of the conductive water-absorbing material is $$1 \le \frac{Si}{Ti} \le 10;$$

a conductive layer containing materials selected from the group consisting of a metal component, an alloy material, a conductive oxide component that is a metallic oxide or a non-metallic oxide, and a mixture including either (a) more than one of the foregoing components or (b) the metal component, the alloy material, and graphite, attached to end surfaces at two sides of the water-absorbing material;
   a pair of electrode structures, coupled to two sides of the water-absorbing material respectively, and each having multiple sub-electrodes insulated from each other; and
   a voltage source, coupled to the pair of electrode structures.

2. The electrified desorption device according to claim 1, wherein the conductive water-absorbing material containing titanosilicates is selected from the group consisting of:
   a titanosilicate material having a titanosilicate content ranging from 1% to 99.99% by weight,
   a mixture with titanosilicates as the main component and aluminosilicates, and
   a mixture with titanosilicates as the main component and non-titanosilicates including conductive or non-conductive substances having a content of non-titanosilicates ranging from 0.01% to 95% by weight.

3. The electrified desorption device according to claim 1, further having a regeneration air passage, for an airflow to pass through.

4. The electrified desorption device according to claim 3, wherein each sub-electrode on each electrode structure has a conductive cable, and the conductive cable is coupled to a power distribution unit.

5. The electrified desorption device according to claim 3, wherein each electrode structure is capable of being further coupled to an electric brush.

6. The electrified desorption device according to claim 3, wherein the airflow is a heated airflow.

7. The electrified desorption device according to claim 1, wherein the voltage source provides a voltage to the pair of electrode structures, and the voltage is an alternating current (AC) voltage or a direct current (DC) voltage.

8. The electrified desorption device according to claim 1, wherein the metal component is a pure metal material.

9. The electrified desorption device according to claim 1, wherein each electrode structure further has:
   a conductive structure, coupled to the water-absorbing material; and
   multiple insulation frames, disposed on the conductive structure to divide the conductive structure into multiple sub-electrodes insulated from each other.

10. The electrified desorption device according to claim 9, wherein the conductive structure is a metal net, a metal strip, or a metal wire.

11. The electrified desorption device according to claim 3, further having a collection air passage, corresponding to the regeneration air passage.

12. The electrified desorption device according to claim 11, further having a positioning sensing module, used to sense positions of the regeneration air passage and the collection air passage.

13. The electrified desorption device according to claim 12, wherein the positioning sensing module has a light emitting element and an optical signal receiving element, the light emitting element is disposed on the regeneration air passage, and the optical signal receiving element is disposed on each sub-electrode.

14. The electrified desorption device according to claim 1, wherein the voltage source further has a power distribution unit, electrically connected to the multiple sub-electrodes respectively.

15. The electrified desorption device according to claim 1, wherein the voltage source has a voltage below 500 volts.

* * * * *